Patented Sept. 29, 1953

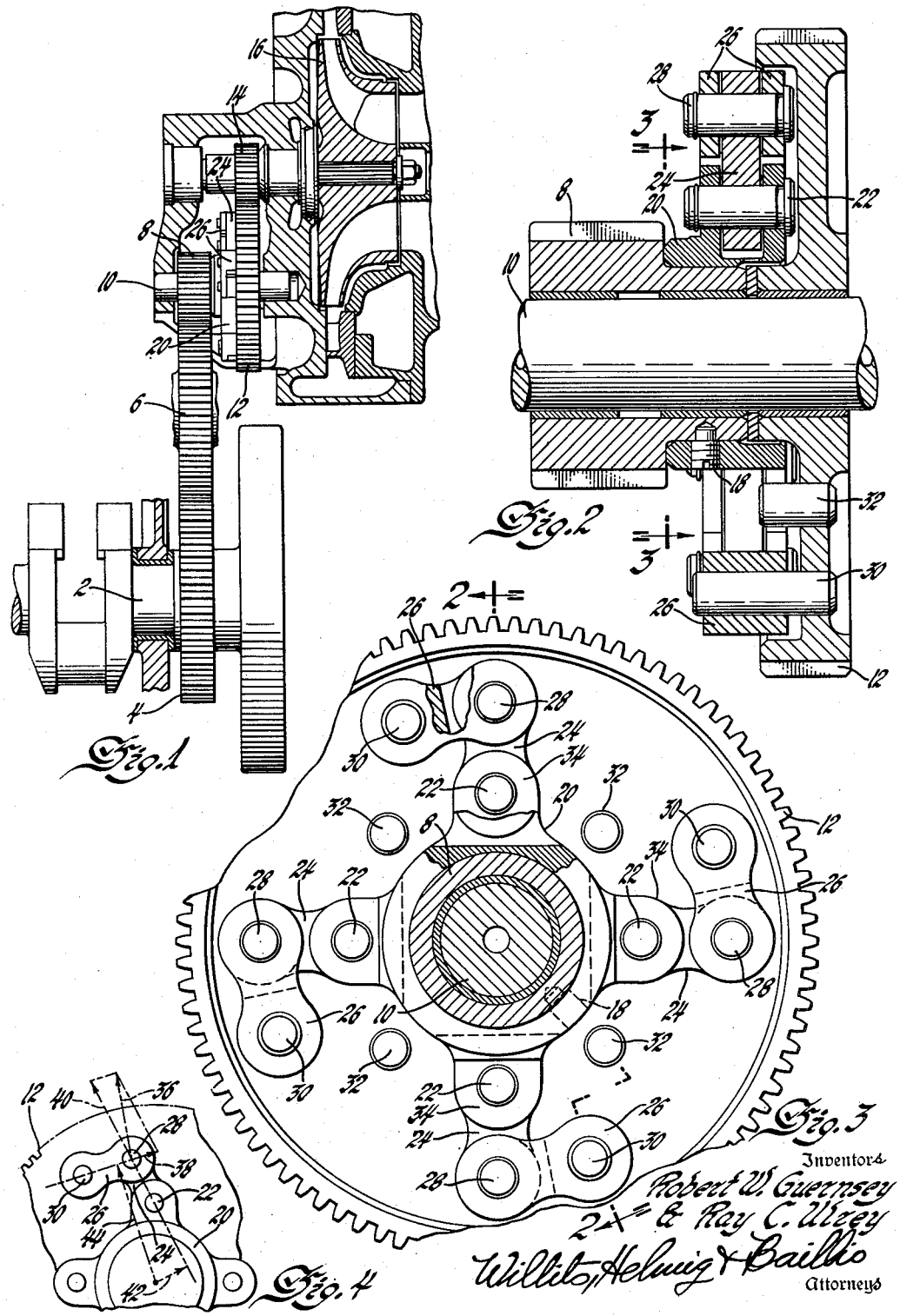

2,653,457

UNITED STATES PATENT OFFICE 2,653,457

FLEXIBLE LINK DRIVE FOR ISOLATING TORSIONAL VIBRATION

Robert W. Guernsey, Detroit, and Ray C. Ulrey, Livonia, Mich., assignors to General Motors Corporation, Detroit, Mich., a corporation of Delaware Application February 2, 1950, Serial No. 142,045

1 Claim. (Cl. 64—12)

The present invention relates to torsional vibration absorbing couplings for rotating members and relates more particularly to couplings which exert a torsional vibration-damping torque that is a function of the angular velocity of the members and of their phase displacement.

The elimination and/or minimizing the effects of torsional vibration has long been a difficult problem in multiple cylinder high speed engines. This problem and its solution is especially acute when an engine driven shaft subject to torsional vibration is used to drive a member having high inertia forces and thereby tends to act as a seismic mass.

Several solutions for the elimination and/or minimizing the effect of torsional vibration have been advanced. Many of these use a seismic mass suspended by a frictional coupling to the vibrating member. Frictional devices have also been used as coupling members to isolate the effect of torsional vibration. They are usually subject to slipping and inherent excessive wear.

Fluid couplings have also been used to isolate torsional vibrations. Such couplings are expensive to build, require a large amount of space and are subject to hydraulic leaks and other maintenance difficulties. Certain attempts have previously been made to use a mechanical linkage for absorbing torsional vibration, one of these being shown in Georgevitch Patent 1,716,225. The construction shown in this patent requires a large amount of space and will be subject to breakage under conditions of high torque at low speed.

It is therefore an object of the present invention to provide a torsional vibration absorbing coupling with a minimum of frictional losses therein.

It is another object of the present invention to provide a torsional vibration absorbing coupling in which the rigidity of coupling varies as a squared function of the angular velocity of the members being coupled.

It is a further object of the present invention to provide a torsional vibration absorbing coupling with means for limiting the angular movement between the driving and driven member.

It is a further object of the present invention to provide a torsional vibration absorbing coupling which is simple and compact in construction and is subject to a minimum of service difficulties.

Other objects of this invention will become apparent upon reading the specification and inspection of the drawing and will be particularly pointed out in the claim.

Referring to the figures in the drawing,

Figure 1 is a general arrangement cross sectional view showing the present invention used in a supercharger drive.

Figure 2 is a longitudinal cross section of one modification of the present invention taken substantially on line 2—2 of Figure 3.

Figure 3 is a transverse partial cross section of the present invention taken on line 3—3 of Figure 2.

Figure 4 is a force diagram.

Referring more particularly to Figure 1 in the drawing, 2 is a crankshaft of an internal combustion engine having a spur gear 4 attached thereto subject to torsional vibration. The small spur gear 8 is driven at high angular velocity by the gear 4 through idler gear 6. The gear 8 is rotatably mounted on fixed shaft 10. The gear 8 is coupled to the spur gear 12 by means of the torsional vibration absorbing coupling which will be more particularly described in connection with Figures 2 and 3. Spur gear 12 drives the supercharger blower 16 through gear 14 which is rigidly mounted on a common shaft with the blower 16.

Referring now more particularly to Figures 2, 3 and 4, the gear 8 has a collar member 20 rigidly attached thereto by means of set screws 18. The member 20 has pivotally attached thereto through pins 22 torque-transmitting links 24 which are in turn pivotally attached to a second set of torque-transmitting links 26 by means of pin 28. The links 26 are pivotally attached to the gear 12 by means of pins 30. It may thus be seen that the collar 20 and hence the gear 8 is attached to the gear 12 through a linkage mechanism including links 24 and 26. The links 24 and 26 may be made out of suitable material to give the desired weight, mechanical strength and wear resistive qualities. In one particular application of this invention weights have been added to the pivot between these two links. Under conditions of operation at high speed and normal torque, the linkage assumes the position substantially as shown in Figures 2 and 3. The exact position the links assume depends upon the centrifugal forces acting upon the linkage and upon the torque which is being transmitted between the gear 8 and the gear 12. Under starting conditions the torque-speed characteristics would be such as to cause a high angular displacement between the driving and driven member. In order to limit this angular displacement and thereby minimize the service difficulties which will be encountered, stop pins 32 are provided on the gear 12 suitable for engaging the projecting portions 34 of the collar member 20.

As specifically illustrated, the radial displacement of the pin 30 from the center of rotation of the members is equal to the radial displacement of the pin 22 from the center of rotation plus the distance from the center of the pin 22 to the center of the pin 28. This dimension need not have this exact relationship but it is desirable that the radial displacement of the pin 30 be substantially greater than that of the pin 22. It is apparent that the radial position of these pins may be interchanged. In other words, when it is desirable to drive a small member from a large member the pin on the driving member may be located at a substantially greater distance from the center of rotation than the pin on the driven member. In other words, the gear 12 could be used to drive the gear 8 with the linkage illustrated.

*Operation*

In the particular embodiment shown, the position of the linkage is illustrated for clockwise rotation with the gear 8 driving the gear 12. If the gear 12 is driving the gear 8 or if the gear 12 is being driven in a counterclockwise direction of rotation, the angle between the links 24 and 26 would be an acute angle instead of an obtuse angle as illustrated in Figure 4. This angle of course fluctuates in magnitude during torsional vibration of the driving member.

If we assume that one-half the mass of each link is concentrated at the pin at each end thereof (with short links as here illustrated), this assumption is not appreciably an error. It is readily apparent that the centrifugal forces exerted by the masses assumed to be concentrated at the pins 22 and 30 have a radial component only and therefore cannot exert any torque on either the driving or driven member and this will be ignored in the force analysis to follow. The mass assumed to be concentrated at the pin 28 exerts a centrifugal force 36 thereon which may readily be calculated using the accepted engineering formula and inserting therein the instantaneous angular velocity of the pin 28 and one-half the combined mass of the arms 24 and 26. The forces exerted between the pin 28 and the pins 22 and 30 must, due to the pivotal nature of the linkage, be exerted in a line including the center of the pin 28 and the center of the respective pins 22 or 30. If we resolve the force 36 into the force between the pins 28 and 30 and the force between the pins 28 and 22, we obtain the force vectors 38 and 40 respectively. The force 38 is that exerted on the pin 30 and the force 40 is that exerted on the pin 22. We also know that the force of 40 times the distance 42 is equal to the torque being exerted by the driving member 8 and the force 38 times the torque arm 44 is equal to the resistance torque being exerted by the gear 12. It will be found that these two torques are equal in magnitude under equilibrium conditions or under conditions of no torsional vibration. The torque-carrying capacity of the coupling may be controlled for a given angular displacement of the arms 26 and 24 at a given rotational speed by varying the mass at the pin 28. It may therefore be seen that the coupling may be given the desired rigidity by varying the amount of mass concentrated at the pin 28.

If we assume that the rotational speed of the driving member is suddenly accelerated, the inertia of the driven member will cause a further relative angular displacement between the arms 24 and 26. Under these conditions the force 36 will be slightly decreased due to the decrease in the radius 44. However, the forces 38 and 40 will be increased due to the change in the angle between the arms 24 and 26. Simultaneously the torque arm 42 will be considerably increased whereas the torque arm 44 will be slightly decreased. It will thus be found that the new instantaneous values of driving and driven torque (42 times 40 and 44 times 38 respectively) are equal and are greater in magnitude than when the mechanism is operating at constant speed. This increase in torque will cause the driven member to accelerate but at a slower rate than that of the driving member. This same line of reasoning can be used to show the torsional effects if the driving member is suddenly decelerated in rotational speed so that the driven member will also decelerate but at a much lower rate.

Inasmuch as torsional vibrations are of relatively high frequency and low amplitude, the high acceleration rates of the driving member will not be transmitted through the coupling to the driven member and the angular relationship of the links 24 and 26 will fluctuate, absorbing energy during acceleration and giving it up during deceleration, whereby a torque free from fluctuations of any great magnitude is exerted upon the driven member 12. It may thus be seen that the mechanism tends to absorb the torsional vibration of the shaft 2 at the point 4 thus decreasing the amplitude of the vibration at this point while simultaneously absorbing these vibrations so that they are not passed on to the driven member 12. In other words, during the acceleration phase of the period of torsional vibration, the linkage exerts a greater resistive torque on the shaft to resist the acceleration and to accumulate energy. During the deceleration phase of the torsional vibration the mechanism gives up energy to decrease the amplitude of vibration and maintain the torque exerted on the driven member 12 substantially constant.

It is to be understood also that although the invention has been described with specific reference to a particular embodiment thereof, it is not to be so limited, since changes and alterations therein may be made which are within the full intended scope of this invention as defined by the appended claim.

We claim:

A torsional vibration absorbing coupling for rotating members including; a driving member, a driven member, said members being rotatable substantially concentric with each other, a first set of torque-transmitting links pivotally supported on one of said members at spaced circumferential points, a second set of torque-transmitting links pivotally supported on the other of said members at spaced circumferential points and at a greater radial distance from the center of rotation of said members than the pivotal supports of said first set of links, each of said sets consisting of more than two links, means for pivotally attaching said second set of links to said first set of links in angular relationship to form a plurality of linkage pairs adapted and arranged to transmit equal amounts of torque between said members during driving rotation, each of said linkage pairs extending in the same circumferential direction, and the pivotal supports of the first set of links having permissive ranges of movements on both sides of imaginary lines drawn from the pivotal attachments between the sets of links and the center of rotation of said members and pin elements mounted on one of said members, said pin elements abutting the other of said members when the angular displacement between said members is a predetermined amount, said pins being spaced from the abutting portions of said other member a distance less than the overall extended length of the attached links.

ROBERT W. GUERNSEY.
RAY C. ULREY.

References Cited in the file of this patent

UNITED STATES PATENTS

| Number | Name | Date |
|---|---|---|
| 1,716,225 | Georgevitch | June 4, 1929 |
| 2,050,340 | King | Aug. 11, 1936 |

FOREIGN PATENTS

| Number | Country | Date |
|---|---|---|
| 435,989 | Great Britain | 1935 |